US012504469B2

(12) United States Patent
Stafford

(10) Patent No.: US 12,504,469 B2
(45) Date of Patent: Dec. 23, 2025

(54) CONTINUOUSLY VARIABLE ELECTRONIC LOAD TESTER FOR USE WITH NUCLEAR INSTRUMENTATION SYSTEM HIGH VOLTAGE POWER SUPPLIES

(71) Applicant: Westinghouse Electric Company LLC, Cranberry Township, PA (US)

(72) Inventor: Shawn C. Stafford, Scottdale, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 105 days.

(21) Appl. No.: 18/420,034

(22) Filed: Jan. 23, 2024

(65) Prior Publication Data

US 2025/0237698 A1 Jul. 24, 2025

(51) Int. Cl.
  *G01R 31/30* (2006.01)
  *G01R 19/165* (2006.01)
  *G01R 31/28* (2006.01)
  *G01R 31/40* (2020.01)

(52) U.S. Cl.
  CPC ... *G01R 31/3012* (2013.01); *G01R 19/16519* (2013.01); *G01R 31/2839* (2013.01); *G01R 31/2843* (2013.01); *G01R 31/40* (2013.01)

(58) Field of Classification Search
  CPC .......... G01R 31/3012; G01R 19/16519; G01R 31/2839; G01R 31/2843; G01R 31/40
  USPC ..................... 324/764.01, 537, 500
  See application file for complete search history.

(56) References Cited

U.S. PATENT DOCUMENTS

| 5,394,025 | A | 2/1995 | Pierson |
| 5,910,924 | A | 6/1999 | Tanaka et al. |
| 6,137,367 | A | 10/2000 | Ezzedine et al. |
| 8,233,974 | B2 * | 7/2012 | Ward ................... A61B 5/0537 |
| | | | 600/547 |
| 8,242,629 | B2 | 8/2012 | Palatini |
| 12,366,607 | B2 * | 7/2025 | Jing ....................... G01R 31/40 |

(Continued)

FOREIGN PATENT DOCUMENTS

| EP | 2228901 A1 | 9/2010 |
| TW | 358938 B | 5/1999 |

OTHER PUBLICATIONS

International Search Report and Written Opinion for corresponding International Application No. PCT/US2025/012760 mailed Jun. 4, 2025.

*Primary Examiner* — Giovanni Astacio-Oquendo

(74) *Attorney, Agent, or Firm* — K&L Gates LLP

(57) ABSTRACT

A variable electronic load tester circuit comprising a control circuit and a variable electronic load circuit coupled to the control circuit to receive a voltage from a power supply and present a load to the power supply. The variable electronic load circuit comprises a plurality of transistors connected in series and operable as variable resistors. The control circuit is to control a resistance of the variable resistors to control the load presented to the power supply. The control circuit comprises an error amplifier to compare a first voltage to a feedback signal and an output signal indicative of a difference between the first voltage and the feedback signal. The output signal is to control the resistance of the variable electronic load circuit to vary the load presented to the power supply. The feedback signal is proportional to a current flowing through the variable electronic load circuit.

20 Claims, 6 Drawing Sheets

(56) References Cited

U.S. PATENT DOCUMENTS

2022/0075004 A1* 3/2022 Sakurai .................. H03K 5/24
2023/0350445 A1   11/2023 Kao

* cited by examiner

CONTINUOUSLY VARIABLE ELECTRONIC LOAD TESTER FOR USE WITH NUCLEAR INSTRUMENTATION SYSTEM HIGH VOLTAGE POWER SUPPLIES

FIELD

This disclosure relates generally to the field of testing high voltage power supplies. More particularly, the present disclosure is related to the field of testing high voltage power supplies used in nuclear power instrumentation.

SUMMARY

In part, in one aspect, the disclosure relates to a variable electronic load tester circuit comprising a control circuit and a variable electronic load circuit coupled to the control circuit to receive a voltage from a power supply and present a load to the power supply. The variable electronic load circuit comprises a plurality of transistors connected in series and operable as variable resistors. The control circuit is to control a resistance of the variable resistors to control the load presented to the power supply. The control circuit comprises an error amplifier to compare a first voltage to a feedback signal and an output signal indicative of a difference between the first voltage and the feedback signal. The output signal is to control the resistance of the variable electronic load circuit to vary the load presented to the power supply. The feedback signal is proportional to a current flowing through the variable electronic load circuit.

In part, in another aspect, the disclosure relates to aln part, in another aspect, the disclosure relates to a Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used comprising laser, laser-based communication system, waveguide, fiber, transmitter, transceiver, receiver, and other devices and systems without limitation. These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
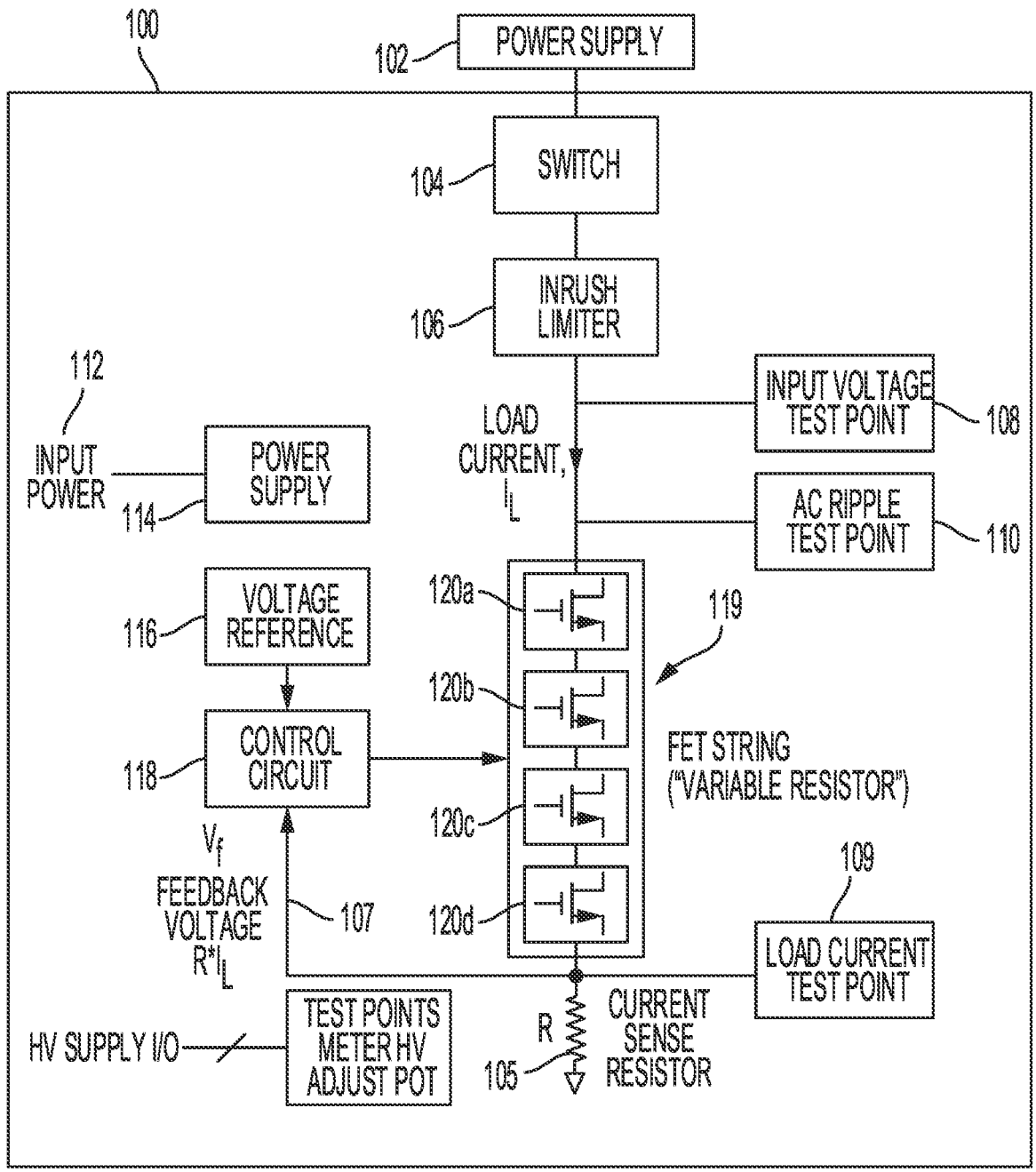
FIG. 1 illustrates a continuously variable electronic load tester for high voltage power supplies, according to at least one aspect of this disclosure.

High voltage power supplies are used throughout nuclear instrumentation systems (NIS). In particular these high voltage power supplies are used to provide the electric field used in proportional counter or ion chamber type ex-core nuclear detectors. For example, in the Westinghouse NIS, these high voltage power supplies provide a bias voltage for detectors in the process of converting neutron interactions to charge pulses, or currents at rates or magnitudes proportional to the neutron flux. The resulting signals are processed in the NIS to provide an indication of nuclear plant power and to provide signals used in subsequent safety systems.

Older high voltage power supplies are increasing in unreliability and in need of repair. High voltage power supplies are also difficult to test. Testing methods include connecting high voltage outputs to various high voltage rated load resistors while measuring output parameters such as output ripple and load regulation. Performing such limited scope testing wears the connector hardware and does not allow a full range of tests while requiring additional test equipment and setups. For example, AC ripple testing requires testing outside the installation with separate hardware.

For power supplies that provide one pre-set output voltage, power supply performance parameters such as load regulation, output ripple, noise, etc. are typically tested by loading the output with a discrete resistor, one which provides maximum loading of the supply (e.g., at maximum current). For power supplies that provide a variable output voltage, other resistor values can be used to load the power supply at other voltages, typically at the maximum rated output current. However, for high voltage power supplies such as those used in the NIS, circuit design is more complex to achieve the high voltages, and the application in an NIS places a higher demand on maintaining performance parameters such as ripple and load regulation where performance beyond specification can impact the safety function signal integrity.

Therefore, testing the output with discrete resistor values may prove inadequate as other combinations of output voltage and current apart from what is tested can cause unexpected instabilities or degradation in performance. Additional discrete resistors can be used for testing, but with added complexity the resistors have to be rated for high voltage and high power applications. Furthermore, using multiple resistors requires switching techniques for selecting particular resistors during the testing process, which adds additional complexity because the switches, relays, or other switching components also must be rated for high voltage and high power applications. Nonetheless, the use of additional discrete resistance/voltage combinations still cannot adequately encompass all the loading conditions where unexpected operational issues may occur.

The state of the art of continuously variable electronic loading for higher power/lower voltage supplies is not well suited for high voltage/low power instrumentation power supplies such as those used in the NIS. The present disclosure provides a continuously variable electronic load for high voltages with an apparatus for loading the power supplies at a continuous range of currents at any voltage within a typical range of use of the power supply output that is well suited for high voltage/low power instrumentation power supplies.

In general, the present disclosure provides an apparatus for providing a continuously variable electronic load comprising a variable electronic load circuit comprising a plurality of transistors operated as variable resistors, connected in series to divide the voltage of the power supply. The resistance of the plurality of transistors is set by a control circuit. Thus, the apparatus enables testing of high voltage power supplies using a continuous load at varying resistances.

Although there are various high voltage high power field effect transistors (FETs) that can perform the function of the plurality of transistors with one device, there are fewer choices and the cost is significantly higher. In addition, power dissipation is more challenging with a singular transistor. By connecting more common and less expensive transistors in series, the transistors share the burden of heat and voltage to reduce design complexity and increase reliability at a fraction of the cost. A continuously variable electronic load tester with the ability to test other aspects of power supply operations provides a better testing method and apparatus for high voltage power supplies.

FIG. 1 illustrates a continuously variable electronic load tester circuit 100 for a power supply 102 according to at least one aspect of this disclosure. The continuously variable electronic load tester circuit 100 illustrated in FIG. 1 is one example of an apparatus for testing a power supply 102 referred to herein as a load tester. The power supply 102 may be a high voltage power supply. A high voltage power supply may have a voltage up to 2500 VDC. The power supply 102 is coupled to the variable electronic load tester circuit 100 for testing the power supply 102.

The continuously variable electronic load tester circuit 100 comprises a control circuit 118 coupled to a variable electronic load circuit 119, which is coupled to the power supply 102. The control circuit 118 controls the current through the variable electronic load circuit 119. The variable electronic load circuit 119 acts as a variable resistance controllable by the control circuit 118. The variable electronic load circuit 119 comprises a plurality of transistors 120a, 120b, 120c, 120d connected in series to divide the power supply 102 voltage together with a current sense resistor 105 at a predetermined current set by the control circuit 118. When a particular programming voltage is set with the control circuit 118, the power supply 102 voltage is constant. Thus, the resistance of the variable electronic load circuit 119 varies as a function of the programming voltage set by the control circuit 118.

The variable electronic load circuit 119 provides a variable load coupled to the output of the power supply 102. As shown in the example of FIG. 1, the variable electronic load circuit 119 comprises a plurality of N-type Metal Oxide Silicon Field Effect Transistors (N-MOSFET) type transistors 120a, 120b, 120c, 120d connected in series. Variable loading is accomplished by exploiting the linear region of N-MOSFETs. As shown in FIG. 1, the variable electronic load circuit 119 comprises four transistors 120a, 120b, 120c, 120d. The variable electronic load circuit 119 may comprise additional or fewer transistors. In general, the variable electronic load circuit 119 acts as a variable resistor divider together with the current sense resistor 105 to form a current source. Each transistor 120a-d may have its own gate drive resistor (shown in FIG. 3).

The current that flows through the gate drive resistors generates the gate drive voltage for each of the transistors 120a, 120b, 120c, 120d. Controlling each transistor 120a, 120b, 120c, 120d with an equal amount of voltage drop through the gate drive resistors ensures that each transistor 120a, 120b, 120c, 120d is driven equally and therefore will all have nearly the same resistance. The resistors may be high voltage type resistors and are chosen to be large in value to limit the current consumption, which will be in addition to the FET string load current $I_L$.

Figure 2:
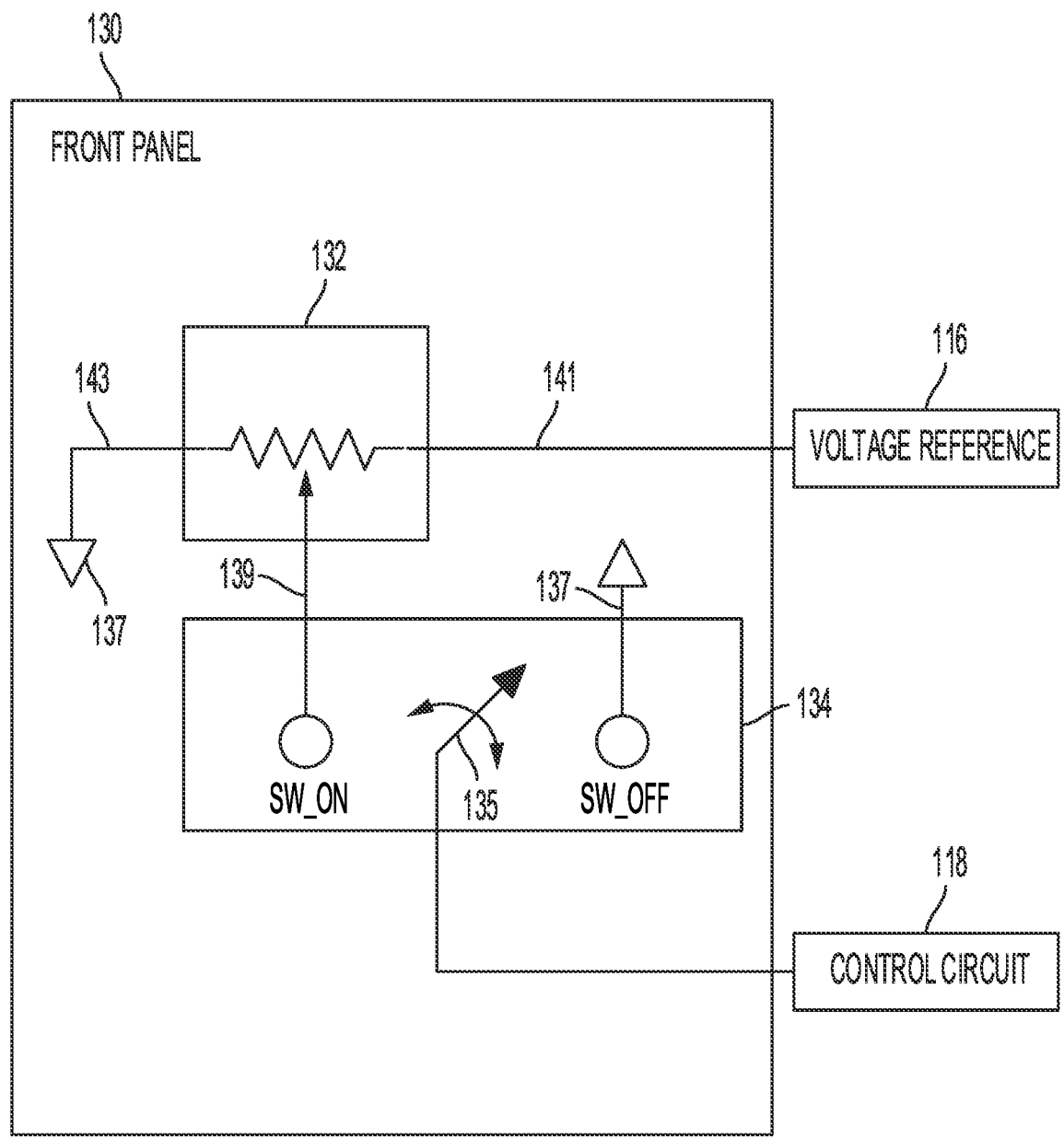
FIG. 2 illustrates a front panel for controlling the programming voltage, according to at least one aspect of this disclosure.

The control circuit 118 controls the amount of current flowing through the variable electronic load circuit 119 by controlling the drive voltage to the gates of the transistors 120a, 120b, 120c, 120d until a feedback signal developed on current sense resistor 105 matches a reference voltage set by a potentiometer 132 on a front panel 130 of the load tester as shown in FIG. 2, for example.

Referring back to FIG. 1, the load tester circuit 100 may comprise a load current test point 109 disposed between the variable electronic load circuit 119 and a current sense resistor 105. The load current $I_L$ flowing through the current sense resistor 105(R) generates an output voltage (e.g., $R*I_L$) which serves as the feedback signal 107. The feedback signal 107 may be buffered by an amplifier that forms a gain circuit to drive the load current test point 109. The gain circuit may scale the output voltage across the current sense resistor 105 so that 1 V corresponds to 1 mA. Additional resistors and diodes may be included in the load tester circuit 100 to provide electrostatic discharge (ESD) protection to the buffer amplifier output and to provide protection from high voltage on the load current test point 109 in the event of a component failure within the load tester circuit 100 (shown in FIG. 4).

The load tester circuit 100 may comprise a programmable voltage reference circuit 116 coupled to the control circuit 118. For example, the voltage reference circuit 116 provides an output voltage to the control circuit 118 to set the load current $I_L$ through the variable electronic load circuit 119. The voltage output by the voltage reference circuit 116 may be programmable to change the output voltage of the control circuit 118. Thus, varying the output voltage of the voltage reference 116 varies the load current $I_L$ through the variable electronic load circuit 119. A user may control the voltage output of the voltage reference circuit 116 with user inputs located on the front panel 103 of a NIS as shown in FIG. 2.

For example, the output voltage of the voltage reference circuit 116 is provided as the input to the control circuit 118. Varying the output voltage of the voltage reference 116 causes the control circuit 118 to vary the voltage supplied to the gate drive resistors (shown in FIG. 3) to set the current through the variable electronic load circuit 119. As a result of varying the voltage supplied to the gate drive resistors, the variable electronic load circuit 119 changes its resistance so that the feedback signal 107 developed on load resistor 105 matches the programmed voltage. This allows a continuous range of programmed resistances for testing the power supply 102.

The load tester circuit 100 may comprise an electromagnetically controlled switch in the form of a relay switch 104. The power supply 102 is coupled to the relay switch 104 in the load tester circuit 100. The relay switch 104 also couples to the variable electronic load circuit 119. The relay switch 104 has two configurations, an open configuration and a closed configuration. When the relay switch 104 is in the closed configuration, the power supply 102 is connected to the variable electronic load circuit 119. In an open configuration, the power supply is disconnected from the variable electronic load circuit 119. The relay switch 104 is in the closed configuration only when power from the internal power supply 114 is provided by providing input power 112. Without power from the internal power supply 114, the relay switch remains in the open configuration thereby decoupling the power supply 102 from the variable electronic load circuit 119.

The load tester circuit 100 may comprise an inrush limiter 106. The inrush limiter 106 is coupled between the relay switch 104 and the variable electronic load circuit 119. The inrush limiter 106 may be a low pass filter, which serves to limit the rise time of the high voltage signal as it appears on the variable electronic load circuit 119. For example, due to the large size of the gate drive resistors of the FET transistors 120a-d, the input capacitance of the FET transistors 120a-d at the gate will incur a time delay compared to the voltage appearing on the input terminals of the FET transistors 120a-d. If the transistors 120a-d are not adequately controlled during the power-up transient, the transistors 120a-d may be damaged by exceeding the drain-source voltage limits. For example, the voltage drop across a resistor in the low pass filter sets the minimum testable output voltage around 100 V. However, NIS power supplies, like the power supply 102, are not operated at such low output voltage levels, so there is no impact to the practical functionality of the load tester circuit 100.

The load tester circuit 100 may comprise an internal power supply circuit 114 with an input power 112. A low voltage split rail power supply provides the input power for rail voltages for the control circuitry and amplifiers of the load tester circuit 100. The power supply circuit 114 delivers both a regulated positive and a negative voltage rail to for the amplifiers of the load tester circuit 100. In one aspect, the power supply circuit 114 converts the input power 112 VAC, line voltage alternating current (AC) input, to a DC voltage, avoiding DC-DC switching type converters which can become problematic with noise in circuitry with high amounts of gain and bandwidth. Power supply protection diodes provide conservative protection of the power supply regulators due to the safety factor involved in controlling circuits that control high voltages. Both positive and negative regulators are adjustable to provide additional flexibility in the circuit operation when different rail voltages are used. In one aspect, a replaceable fuse in line with the AC input provides protection for the load tester 100 circuitry in the event of circuit faults.

The load tester circuit 100 may comprise a voltage test point 108 coupled between the inrush limiter 106 and the variable electronic load circuit 119. The voltage test point 108 comprises a resistive voltage divider circuit to provide a scaled version of the high voltage supply output. For example, the divider consists of a high voltage style metal oxide resistor and a ⅛ W resistor lower in resistance by a factor of approximately 1000. This sets the test point voltage at a factor of 1000 times less than the high voltage input from the power supply 102 for easy and safe measurement. In one aspect, a potentiometer coupled in series with the lower resistor in the voltage divider allows adjusting for resistor tolerances and setting the ratio to be 1:1000 for better precision in the test point reading. This can be done using a Digital Multi-Meter (DMM) to measure the output of the high voltage supply directly while set at voltages within the DMM range and setting the potentiometer to read precisely 1/1000 of the measured input voltage.

The load tester circuit 100 may comprise an AC ripple test point 110 coupled between the inrush limiter 106 and the variable electronic load circuit 119. Due to the high gains and other aspects involved in the feedback operation of the power supply 102 under test, AC ripple may occur at particular output voltage/current settings or load conditions. Therefore, a separate test point on the high voltage input side is provided to measure the amount of ripple on the power supply output voltage. For example, transient voltages due to corona discharge or component failure within the supply also can occur during abnormal operation. All such signals are referred to as Periodic and Random Deviation (PARD) and will be present on this test point, if they occur, and are important test points as these effects may influence detector operation and cause other difficulties in the instrumentation of the detector signals. The test point connection is suitable for connection to an oscilloscope to view the signals in more detail than would otherwise be provided by a DMM.

FIG. 2 illustrates a user interface front panel 130 for controlling the voltage reference circuit 116, according to at least one aspect of this disclosure. The front panel 130 may comprise inputs selectable by a user. The front panel 130 comprises a potentiometer 132 and a switch 134. The potentiometer 132 and the switch 134 are adjustable by the user. One side 141 of the potentiometer 132 is coupled to the output of the voltage reference circuit 116 from the load tester circuit 100. The other side 143 of the potentiometer 132 is coupled to ground 137. The wiper 139 of the potentiometer 132 is coupled to the SW_ON terminal of the front panel switch 134. The SW_OFF terminal of the front panel switch 134 is coupled to ground 137. The SW_POLE terminal of the front panel switch 134 is coupled to the control circuit 118 in the load tester circuit 100. The front panel switch 134 has two modes. In a first mode, the SW_POLE of the switch 134 is coupled to the SW_OFF pole and in a second mode, the SW_POLE of the switch 134 is coupled to the SW_ON pole. In the OFF mode, ground 137 (e.g., 0 V) is applied to the control circuit 118 thereby setting the current to 0 mA. In the ON mode, the voltage at the wiper 139 of the potentiometer 132 is applied to the control circuit 118.

By switching between the first and second modes, the current through the voltage divider circuit formed by the potentiometer 132 will change abruptly between 0 mA and a predetermined set point current (between 0 and 20 mA). This abrupt change allows the user to assess the power supply 102 (shown in FIG. 1) under a test response to transient load changes. Additional filtering may be provided by resistors and capacitors to minimize switch "bounce" at the input of the control circuit 118 and to provide some additional filtering.

The potentiometer 132 may be set manually by the user to set the voltage applied to the control circuit 118. The voltage applied to the control circuit 118 controls the load current $I_L$ through the variable electronic load circuit 119 as discussed in connection with FIG. 1.

The reference voltage 116 develops a current through the potentiometer 132. In one aspect, additional resistors and capacitors can provide additional filtering for the reference voltage. A diode may be provided in parallel with the voltage reference circuit 116 to protect the circuitry from ESD events that may arise from repeated user contact with the front panel potentiometer 132. For example, by using a 100 kohm potentiometer on the front panel, the additional resistors for filtering will induce only a minimal drop in voltage and not impact the useful range of operation of the tester.

Figure 3:
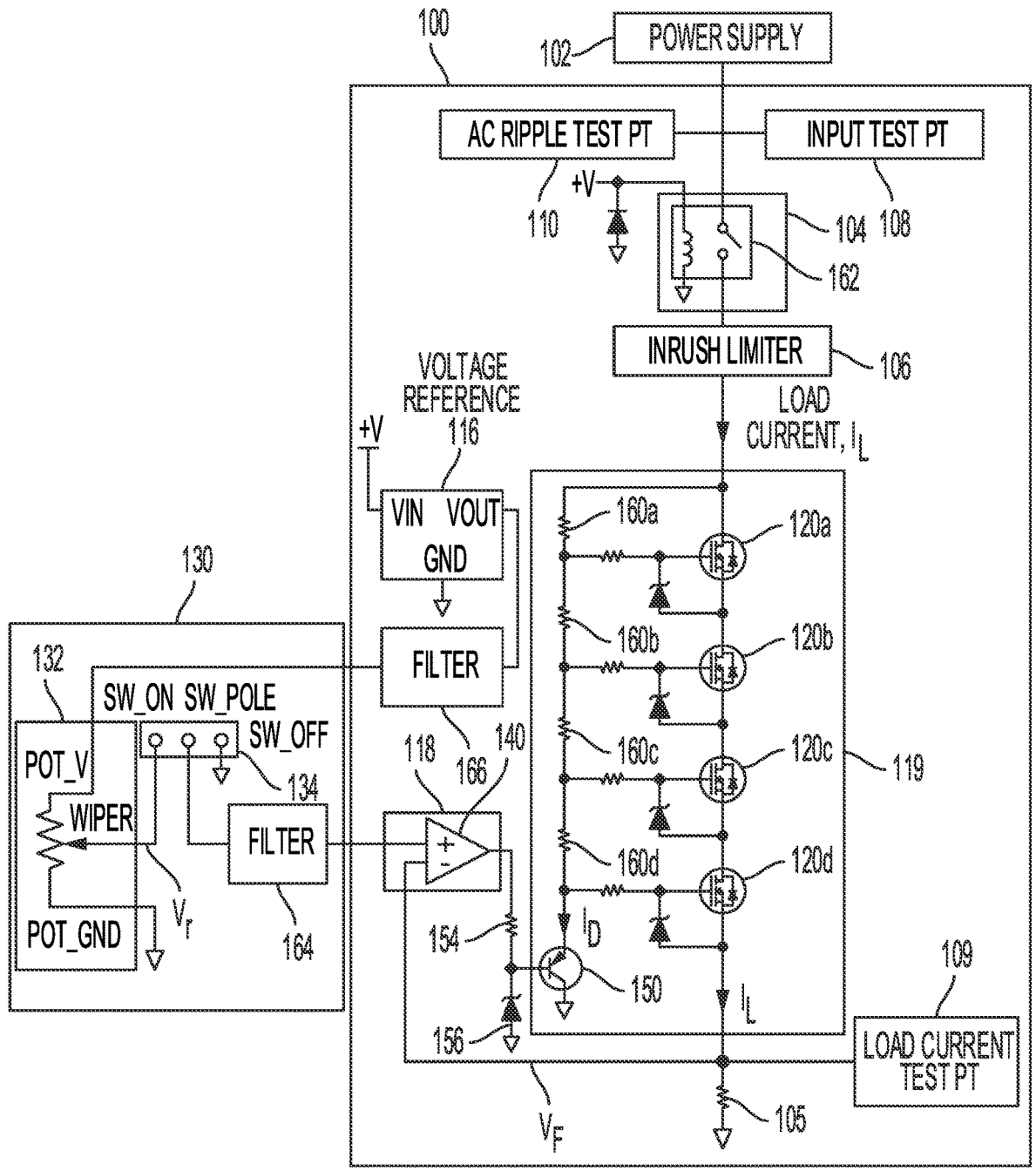
FIG. 3 illustrates the load tester shown in FIG. 1 coupled to the front panel shown in FIG. 2, according to at least one aspect of this disclosure.

FIG. 3 illustrates in more electrical detail the load tester circuit 100 shown in FIG. 1 coupled to the front panel 130 shown in FIG. 2, according to at least one aspect of this disclosure. As shown in the example of FIG. 3, the control circuit 118 comprises an error amplifier 140 that drives resistor network 160a-d which in turn drive the series coupled transistors 120a-d. The error amplifier 140 compares a reference voltage $V_r$ derived from the potentiometer 132 on the front panel 130 to a feedback voltage $V_f$ derived from the current sense resistor 105. The load current $I_L$ through the current sense resistor 105 is the same as the load current $I_L$ through the variable electronic load circuit 119.

The reference voltage $V_r$ is coupled to the non-inverting input (+) of the error amplifier 140. The feedback voltage $V_f$ is coupled to the inverting input (−) of the error amplifier 140. The feedback voltage $V_f$ is the product of the resistance of the current sense resistor 105 and the load current $I_L$ through the variable electronic load circuit 119 since the load current $I_L$ flowing through the current sense resistor 105 is the same as the load current $I_L$ flowing through the variable electronic load circuit 119.

The output of the error amplifier 140 controls the variable resistance of the variable electronic load circuit 119. The error amplifier 140 sets the resistance of the variable electronic load circuit 119 such that the resulting voltage on the inverting input (−) matches the input on the non-inverting input (+). The FET transistors 120a-d act as the variable resistor 119, whose resistance is controlled by the amount of drive voltage from the error amplifier 140.

The error amplifier 140 controls the amount of current in the FET transistors 120a-d by controlling the drive voltage to the gates of the FET transistors 120a-d until the feedback voltage $V_f$ signal matches the programming voltage reference $V_r$ from the front panel potentiometer 132. The FET transistors 120a-d are operated in the linear, or "triode" mode and act as voltage variable resistors whose resistance is determined by the manipulation of the gate voltage of the FET transistors 120a-d. The load current $I_L$, which is controlled by the variable electronic load circuit 119, flows through the current sense resistor 105 and establishes a feedback voltage $V_f$ which serves as the feedback signal to the error amplifier 140 portion of the control circuit 118. In this manner, the load tester circuit 100 operates as an adjustable current source whose current is supplied by the output of the high voltage power supply 102 and controlled by manually setting the front panel 130 potentiometer 132 until the load current $I_L$ reaches the desired level.

It will be appreciated, that in some instances, testing the power supply 102 may be automated. Accordingly, the load tester circuit 100 operates as an adjustable current source whose current is supplied by the output of the high voltage power supply 102 and automatically setting the front panel 130 potentiometer 132 by a computer or processor until the load current $I_L$ reaches the desired level. This configuration requires that the connection to the potentiometer 132 be replaced by a suitable connection on the front panel that interfaces to the computer or processor. The external control voltage signal would be applied to the SW-ON terminal of switch 134 referenced to the load tester ground 137.

In one aspect, the error amplifier 140 portion of the control circuit 118 drives the variable electronic load circuit 119 indirectly. This is achieved by driving a separate transistor 150 in parallel with the variable electronic load circuit 119 to form a separate drive current $I_D$ source. The high voltage power supply 102 also supplies the drive current $I_D$ that flows through a voltage divider network comprising four resistors 160a, 160b, 160c, 160d. The voltage derived from the drive current $I_D$ passing through the resistors 160a-d forms the gate drive voltage for each of the FET transistors 120a-d. Controlling each FET transistor 120a-d with an equal amount of voltage drop through the resistors 160a-d ensures that each FET transistor 120a-d is equally driven and will therefore each of the FET transistor 120a-d will have nearly same resistance.

The resistors 160a-d used in the gate drive voltage divider circuit are of a high voltage type and are chosen to be large in resistance value to limit the drive current $I_D$ consumption which is in addition to the load current $I_L$ through the variable electronic load circuit 119. Precise control of the resistance of the FET transistors 120a-d, whose combined resistance ranges from around 31 kohms up to several Mohms over a gate voltage range of approximately 1 V, is ensured by sufficient gain in the error amplifier 140. A resistor 154 limits the current drive into the base of the transistor 150, stabilizing the output drive signal from the error amplifier 140. A diode 156 protects the output of the error amplifier 140 in the event of a high voltage transient.

The FET transistors 120a-d have a maximum drain-source voltage rating of 1000 V, which provides a margin against damage. For example, when four FET transistors 120a-d are used for a 2500 VDC power supply, the voltage across each of the FET transistors 120a-d will be 2500/4 VDC (625 VDC each), which is a conservative margin against damage. There are various high voltage high power FET transistors that can perform the function of all four FET transistors 120a-d with one FET transistor. There is less variety, however, in single high voltage high power FET transistors. Such transistors cost significantly more and their power dissipation is more challenging to control. By coupling multiple common type FET transistors in series, as shown in FIGS. 1 and 3, each of the FET transistors 120a-d share the burden of heat and voltage drop, thereby reducing design complexity while increasing reliability at a fraction of the cost of the single transistor solution.

Although the example shown in FIG. 3 illustrates four FET transistors 120a-d connected in series fewer or additional FET transistors can be used to implement the variable electronic load circuit 119. For example, the variable electronic load circuit 119 can be implemented using a single FET transistor or two or more FET transistors (e.g., greater than four FET transistors) based on the power rating of each of the individual FET transistor, voltage drop specifications, the high voltage output of the power supply 102, and/or the desired load current $I_L$.

A ripple on the reference voltage 116 will appear on the current controlled by the FETs. For example, the error amplifier 140 (shown in FIG. 3) of the control circuit 118 will control the variable resistor 119 to match the same ripple signal on the current controlled by the transistors 120a-d. As a result, the reference voltage 116 must be well regulated and filtered to have minimal ripple.

The load tester circuit 100 comprises a programming reference, a load transient switch, and a programming potentiometer. The error amplifier 140 programming voltage is well regulated and filtered by a filter 166 to minimize AC ripple voltage applied to the input of the error amplifier 140 otherwise the error amplifier 140 will control the FET transistors 120a-d to match the AC ripple voltage and impose the same AC ripple in the load current $I_L$.

In one aspect, the voltage reference circuit 116 provides a nominal voltage of 10 V, which provides the regulation to serve as the source for the programming voltage. This voltage drives the voltage divider formed by the front panel 130 potentiometer 132 and is used to control the level of the load current $I_L$. A filter 166 provides additional filtering for the programming voltage. Diodes provide protection against ESD events that may occur from repeated contact with the potentiometer 132 on the front panel 130. The resistance of the potentiometer 132 on the front panel 130 is large enough to minimize voltage drops by other resistors in the circuit and not have an impact on the useful range of operation of the load tester circuit 100. The potentiometer 132 may have a value of 100 kohms.

The output of the current programming potentiometer 132 is connected to a switch 134 on the front panel 130. The switch 134 enables the selection of the input voltage into the error amplifier 140. In the example shown in FIG. 3, the switch 134 provides the choice of setting the error amplifier 140 input either to the potentiometer 132 voltage output (SW_ON) or to 0 V, e.g., circuit ground, (SW_OFF). Switching between these two states, abruptly changes the current in the load tester circuit 100 between 0 mA and the set-point current (between 0 and 20 mA). This process enables the assessment of the response of the power supply 102 under test to transient load changes. The filter 164 includes a resistor, capacitor, and resistor circuit to minimize switch "bounce" appearing at the input of the error amplifier 140 and provide additional filtering.

The load tester circuit 100 switch 104 may comprise a high voltage relay 162 coupled in series between the power supply 102 and the variable electronic load circuit 119. The load tester circuit 100 will not be energized by high voltage unless power (+V) is applied to the high voltage relay 162. This minimizes the risk of component damage from high voltage while not being properly controlled with circuit power off.

A high voltage test point 108 formed by a resistive voltage divider circuit on the high voltage input to the load tester circuit 100 provides a scaled version of the output of the high voltage power supply 102 that is the input to the load tester circuit 100. The resistive voltage divider circuit may comprise high voltage style metal oxide resistors as well as low wattage (e.g., ⅛ W resistor) that is lower in resistance by a factor of approximately 1000. This sets the high voltage test point 108 voltage at a factor of 1000 times less than the input voltage to the load tester circuit 100 for easy and safe measurement. This can be done by using a DMM to measure the output of the high voltage power supply 102 directly while set at voltages within the DMM range and setting the potentiometer to read ¹⁄₁₀₀₀ of the measured input voltage. Those skilled in the art will appreciate that other ratios may be employed without departing from the scope of the present disclosure.

An AC ripple test point 110 is provided due to the high gains and other aspects involved in the feedback operation of the power supply 102. AC ripple may occur at particular output voltage/current settings or load conditions of the load tester circuit 100. Therefore, a separate AC ripple test point 110 is provided on the input high voltage side of the load tester circuit 100 to measure the amount of ripple on the power supply 102 output voltage. For example, a 3 kV, 0.1 µF capacitor may be employed to couple any AC ripple to the AC ripple test point 110. Voltage limiting diodes may be employed to clamp the voltage during transient voltage conditions, such as during power up or power down of the power supply 102. Transient voltages due to corona discharge or component failure within the power supply 102 also can occur during abnormal operation. All such signals are referred to as PARD and will be present on the AC ripple test point 110 should they appear and are typically of great interest to the plant operators as these effects may influence detector operation and cause other difficulties in the instrumentation of the detector signals. The AC ripple test point 110 connection is suitable for connection to an oscilloscope to view the signals in more detail than would otherwise be provided by a DMM.

An inrush limiter 106 provided between the switch 104 and the variable resistor 119 may comprise a resistor/capacitor network that forms a low pass filter to limit the rise time of the high voltage input signal as it appears at the input of the variable electronic load circuit 119. Due to the large size of the FET transistor 120a-d gate drive resistors 160a-d, the input capacitance of the FET transistor 120a-d gates will incur a time delay compared to the voltage appearing at the FET transistors 120a-d input terminals. If the FET transistors 120a-d are not adequately controlled, drain-source voltage limits may be exceeded and damage the FET transistors 120a-d. A voltage drop across the inrush limiter 106 sets the minimum testable output voltage around 100 V. However, because the NIS power supplies 102 are not operated at such low output voltage levels, there is no impact to the practical functionality of the load tester circuit 100.

A first order simulation of the actual application is provided by the load tester circuit 100 capacitor connected between the high voltage input at the load tester circuit 100 and ground. The value of the capacitor is on the order of most cable/detector circuits connected to the output of the NIS power supplies.

The load tester circuit 100 may comprise heatsinks. For example, the typical maximum output power of the high voltage power supply 102 is 25 W (2500 V at 0.01 A), although higher voltage supplies with different output powers can be coupled to the load tester circuit 100. Based on this example, each FET transistor 120a-d has to dissipate one fourth of this power, or around 6 W. More generally, if the variable electronic load circuit 119 comprises n transistors, each transistor would dissipate 1/n of output power of the high voltage power supply 102. Adequate heat sinks are selected to provide this level of heat dissipation without the use of fans. The heat sinks are attached to the FET transistors 120a-d inside on the printed circuit board, thus removing any need for heatsinks external to an enclosure for housing the load tester circuit 100.

A current output test point 109 provided between the variable resistor 119 and the current sense resistor 105 is used to measure the feedback voltage $V_f$. The feedback voltage $V_f$, which is derived across the current sense resistor 105 can be buffered by a buffer amplifier. The gain of the buffer amplifier may be set by resistors to scale the output such that 1 V corresponds to 1 mA of current. The output of the buffer amplifier may include a resistor and a diode network to provide ESD protection on the output of the buffer amplifier. Additional resistor and diode networks may be added to provide additional protection against high voltage on the current test point 109 in the event of component failure within the load tester circuit 100.

The load tester circuit 100 comprises a low voltage split rail power supply circuit 114 to provide the rail voltages for the control circuitry and other amplifiers of the load tester circuit 100. The power supply circuit 114 and associated components delivers both a regulated positive and a negative voltage rail to simplify selection of amplifiers in the case of obsolescence or procurement difficulties. The power supply circuit 114 converts a low voltage AC input provided by commonly available AC transformers to the DC voltages used in the circuitry, avoiding DC-DC switcher type converters which can become problematic with noise in circuitry with high amounts of gain and bandwidth. Power supply protection diodes are used to provide conservative protection of the power supply circuit 114 regulators due to the safety factor involved in controlling circuits that control high voltage. Both positive and negative regulators are adjustable to provide additional flexibility in the circuit operation if different rail voltages are needed. A replaceable fuse in line with the AC input provides protection for the load tester circuitry in the event of circuit faults.

Figure 4:
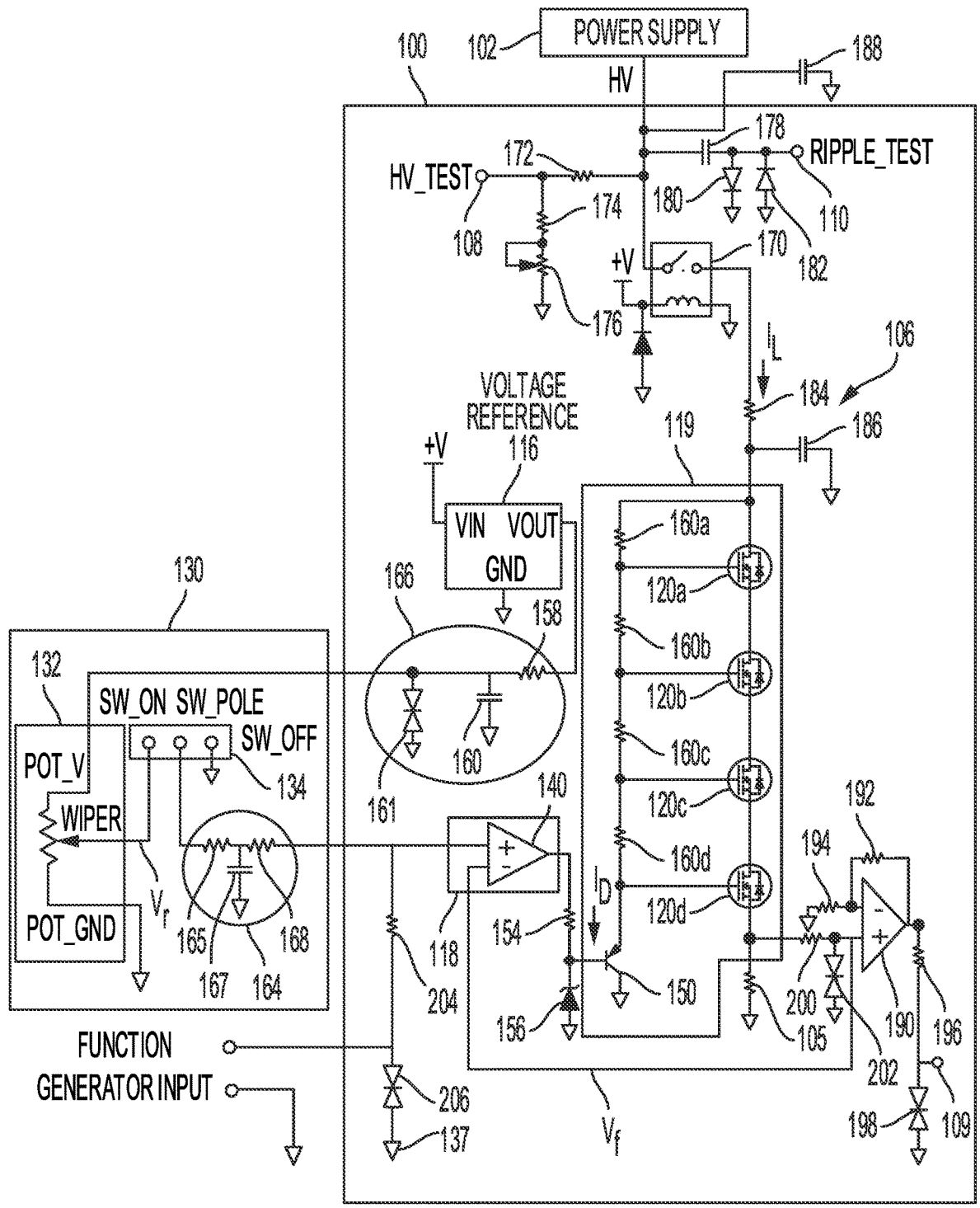
FIG. 4 illustrates a detailed embodiment of the load tester circuit shown in FIG. 3, according to at least one aspect of this disclosure.

FIG. 4 illustrates a detailed embodiment of the load tester circuit 100 shown in FIG. 3, according to at least one aspect of this disclosure. The load tester circuit 100 may comprise an AC ripple test point 110 coupled between the inrush limiter 106 and the variable electronic load circuit 119. For example, the AC ripple test point 110 comprises a series capacitor 178 to couple any ripple to the test point 110. Voltage limiting diodes 180, 182 in parallel with the capacitor clamp the voltage during transient voltage conditions, such as during power up or power down of the supply and serve to protect the measuring instrument and provide safety.

The high voltage test point 108 may comprise a potentiometer 176 in series with the lower value resistor 174 to allow adjustment of the ratio to 1:1000 for better precision of the high voltage test point reading and to adjust for resistor tolerances. A high voltage type resistor 172 is used to drop the input high voltage from power supply 102 for the series network comprised of resistor 174 and the potentiometer 176.

The inrush limiter 106 provided between the switch 104 and the variable resistor 119 may comprise a resistor 184 and capacitor 186 network that forms a low pass filter to limit the rise time of the high voltage input signal as it appears at the input of the variable electronic load circuit 119. Due to the large size of the FET transistor 120*a-d* gate drive resistors 160*a-d*, the input capacitance of the FET transistor 120*a-d* gates will incur a time delay compared to the voltage appearing at the FET transistors 120*a-d* input terminals. If the FET transistors 120*a-d* are not adequately controlled, drain-source voltage limits may be exceeded and damage the FET transistors 120*a-d*. A voltage drop across the inrush limiter 106 sets the minimum testable output voltage around 100 V. However, because the NIS power supplies 102 are not operated at such low output voltage levels, there is no impact to the practical functionality of the load tester circuit 100.

The load tester circuit 100 may comprise a load current test point 109 disposed between the variable electronic load circuit 119 and a current sense resistor 105. The load current $I_L$ flowing through the current sense resistor 105(R) generates an output voltage (e.g., $R*I_L$) that serves as the feedback signal 107, which may be buffered by an amplifier 190 that forms a gain circuit that drives the current test point 109.

The gain circuit may scale the output voltage across the current sense resistor 105 so that 1 V corresponds to 1 mA. For example, the gain circuit comprises an amplifier 190. The gain circuit also includes the resistor 192 and resistor 196 to scale the output voltage so that 1 V corresponds to 1 mA of current. Resistor 194 and diode 198 may be included in the load tester circuit 100 to provide electrostatic discharge (ESD) protection to the buffer the output of the amplifier 190. Resistor 200 and diode 202 may be included to provide protection from high voltage on the load current test point 109 in the event of a component failure within the load tester circuit 100.

The filter 164 includes a resistor 165, a capacitor 167, and resistor 168 to minimize switch "bounce" appearing at the input of the error amplifier 140 and provide additional filtering.

The filter 166 includes resistor 158 and capacitor 160 to provide additional filtering for the voltage reference 116. Diode 161 is configured to provide protection in case of ElectroStatic Discharge (ESD) events prone from repeated contact with the front panel pot. For example, by using a 100 kohm potentiometer for the front panel 130, a 10 kOhm resistor 158 will induce only a minimal drop in voltage and not impact the useful range of operation of the load tester circuit 100.

The control circuit 118 may comprise the error amplifier 140. The output of the error amplifier 140 is coupled to resistor 154 which is configured to limit the current drive into transistor 150 and stabilize the output drive signal from the error amplifier 140. The diode 156 may also be coupled to the output of the error amplifier 140 and is configured protect the output of the error amplifier 140 in the event of a high voltage transient.

In one aspect, the load tester circuit 100 may comprise a function generator input. The function generator input is a separate external signal input for the user to assess the power supply 102 response to AC signals by adding the signal from a function generator to the reference voltage 116. This signal can be in the form of a sine wave, a single pulse, or square wave at various frequencies and amplitudes to gauge the stability of the response of the power supply 102. This can be used in troubleshooting situations where it is suspected that the power supply 102 is unstable at particular operating conditions. A resistor 204 in series with the function generator input provides some current limiting from the signal source while adding the voltage to the programming voltage from the voltage reference circuit 116. A diode 206 to ground 137 provides some protection against ESD events. In one aspect, the load tester circuit 100 of any of FIG. 1, 3, 4, or 5 may comprise a function generator input.

Figure 5:
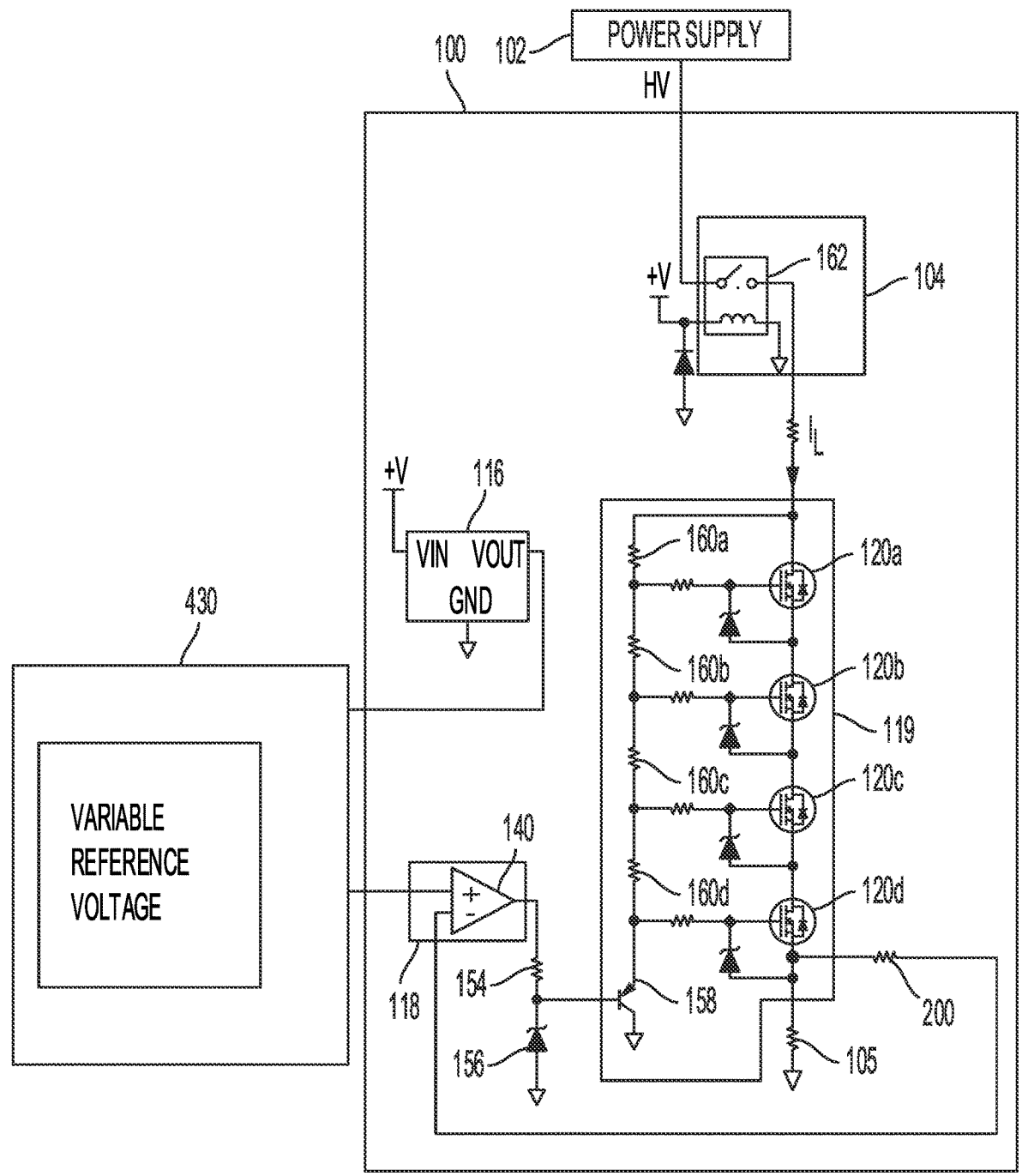
FIG. 5 illustrates the load tester circuit shown in FIG. 3 coupled to a variable programming voltage, according to at least one aspect of this disclosure.

FIG. 5 illustrates the load tester circuit 100 shown in FIG. 3 coupled to a variable reference voltage 430, according to at least one aspect of this disclosure. The variable reference voltage 430 can be an electrical circuit. The electrical circuit is configured to output variable voltage levels. For example, the electrical circuit may include a digital-to-analog converter (DAC) or a digital potentiometer to generate the variable voltage.

Figure 6:
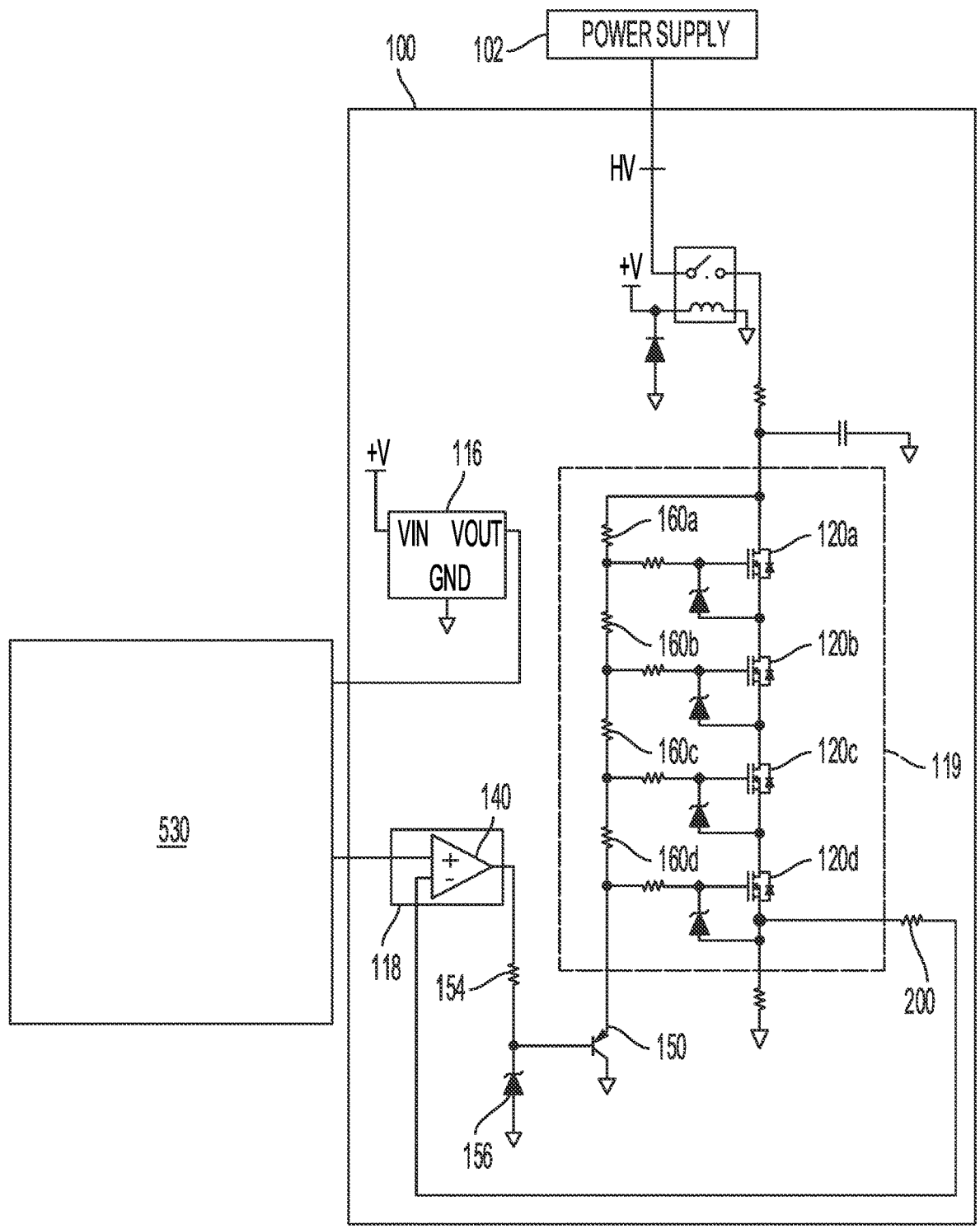
FIG. 6 illustrates the load tester circuit shown in FIG. 3 coupled to an electrical circuit, according to at least one aspect of this disclosure.

FIG. 6 illustrates the load tester circuit 100 shown in FIG. 3 coupled to an electrical circuit 530, according to at least one aspect of this disclosure. For conciseness, all components with the same reference numbers will not be described.

The electrical circuit 530 can be either the front panel 130 or variable reference voltage 430. The transistor 150 is coupled to the variable electronic load circuit 119. The control circuit 118 may comprise the error amplifier 140. The output of the control circuit 118 is coupled to resistor 154 which is configured to limit the current drive into transistor 150.

In one aspect, the transistor 150 functions as described in conjunction with FIG. 3, such that the error amplifier 140 portion of the control circuit 118 drives the variable electronic load circuit 119 indirectly. This is achieved by driving a separate transistor 150 in parallel with the variable electronic load circuit 119 to form a separate drive current $I_D$ source.

In one aspect, the load tester circuit 100 of any of FIG. 1, 3, 4, or 5 may comprise interface test points. The load tester circuit 100 may comprise a panel meter. The load tester circuit 100 may comprise a high voltage output adjust potentiometer. In addition to the high voltage output, the supplies contain interface input/output that correspond to connections within the applicable NIS drawers. The load tester circuit 100 can contain connections for these signals to assess their operation. These interface connections may be provided for the convenience for the operator where additional interface hardware (or the drawers themselves) would otherwise need to be connected directly to a seven-contact terminal strip on the power supply under test.

With the interface testing located on the load tester circuit 100, a panel switch would allow the test technician to select which version of supply is under test (2500 V vs 1500 V) to properly interface to the circuitry. A divider resistor works in conjunction with an internal resistor located within the power supply under test in the 1500 V version to set a test point voltage that simulates the drawer high voltage test points.

For example, a 20 k resistor simulates the loading of a card in the drawer, which monitors the power supply output. A 5 k ohm pot will also be available on the front panel to control the supply under test output voltage, and an adjustable resistor will allow simulating the adjustment of the panel meter reading as is done within the NIS drawers.

Examples of the apparatus and method according to various aspects of the present disclosure are provided below in the following numbered clauses. An aspect of the apparatus or method may include any one or more than one, and any combination of, the numbered clauses described below.

Clause 1. A variable electronic load tester circuit, comprising: a control circuit; and a variable electronic load circuit coupled to the control circuit to receive a voltage from a power supply and present a load to the power supply, wherein the variable electronic load circuit comprises: a plurality of transistors connected in series and operable as variable resistors; and wherein the control circuit is to control a resistance of the variable resistors to control the load presented to the power supply; and wherein the control circuit comprises: an error amplifier to compare a first voltage to a feedback signal and an output signal indicative of a difference between the first voltage and the feedback signal, wherein the output signal is to control the resistance of the variable electronic load circuit to vary the load presented to the power supply, wherein the feedback signal is proportional to a current flowing through the variable electronic load circuit.

Clause 2. The variable electronic load tester circuit of clause 1, wherein the variable electronic load circuit comprises a plurality of resistors of equal value connected in series to equally divide the voltage received from the power supply and connected in parallel with the plurality of transistors.

Clause 3. The variable electronic load tester circuit of clause 2, wherein the plurality of transistors is equal to the plurality of resistors.

Clause 4. The variable electronic load tester circuit of any of clauses 2-3, comprising a transistor connected between the error amplifier and the plurality of resistors, wherein the output signal of the error amplifier is to control a conductance of the transistor to set a current through the plurality of resistors.

Clause 5. The variable electronic load tester circuit of any of clauses 2-4, wherein the plurality of transistors are Field Effect Transistors (FETs); wherein a voltage across each of the plurality of resistors is applied to a gate of each of the plurality of the transistors; and wherein the voltage across each of the plurality of resistors controls a resistance of each of the plurality of transistors.

Clause 6. The variable electronic load tester circuit of any of clauses 1-5, wherein the first voltage used to set the load current.

Clause 7. The variable electronic load tester circuit of any of clauses 1-6, further comprising: a relay coupled to a circuit power supply, wherein the relay is in an activated state when coupled to the circuit power supply, wherein the activated state is configured to power components of the variable electronic load tester circuit and couple the power supply to the variable electronic load circuit.

Clause 8. The variable electronic load tester circuit of any of clauses 1-7, wherein the feedback signal is derived from a current sense resistor.

Clause 9. A method of operating a continuously variable electronic load tester circuit, the method comprising: receiving, by a variable electronic load circuit, a voltage from a power supply; presenting, by the variable electronic load circuit, a load to the power supply; operating, by a control circuit, a plurality of transistors connected in series as variable resistors; controlling, by the control circuit, a resistance of the variable resistors to control the load presented to the power supply; comparing, by an error amplifier, a first voltage to a feedback signal; and outputting, by the error amplifier, an output signal indicative of a difference between the first voltage and the feedback signal, wherein the output signal is to control the resistance of the variable electronic load circuit to vary the load presented to the power supply, wherein the feedback signal is proportional to a current flowing through the variable electronic load circuit.

Clause 10. The method of clause 9, dividing equally, by a plurality of resistors of equal value connected in series and connected in parallel with the plurality of transistors, the voltage received from the power supply.

Clause 11. The method of clause 10, wherein the plurality of transistors is equal to the plurality of resistors.

Clause 12. The method of any of clauses 10-11, further comprising: controlling, a conductance of a transistor based on the output signal, wherein the transistor is connected between the error amplifier and the plurality of resistors; and setting a current through the plurality of transistors based on the conductance of the transistor.

Clause 13. The method of any of clauses 10-12, further comprising: applying a voltage across each of the plurality of resistors to a gate of each of the plurality of transistors; and controlling a resistance of each of the plurality of transistors based on the voltage across each of the plurality of resistors.

Clause 14. The method of any of clauses 9-13, further comprising setting the load current based on the first voltage.

Clause 15. The method of any of clauses 9-14, further comprising: activating a relay based on a circuit power supply being coupled to the relay, powering, by the circuit power supply, components of the variable electronic load circuit; and coupling, by the relay, the power supply to the variable electronic load circuit.

Clause 16. The method of any of clauses 9-15, deriving the feedback signal from a current sense resistor.

Clause 17. A variable electronic load tester circuit, comprising: a control circuit; and a variable electronic load circuit coupled to the control circuit to receive a voltage from a power supply and present a load to the power supply, wherein the variable electronic load circuit comprises: a plurality of transistors connected in series and operable as variable resistors; and wherein the control circuit is to control a resistance of the variable resistors to control the load presented to the power supply; and wherein the control circuit to compare a first voltage to a feedback signal and an output signal indicative of a difference between the first voltage and the feedback signal, wherein the output signal is to control the resistance of the variable electronic load circuit to vary the load presented to the power supply, wherein the feedback signal is proportional to a current flowing through the variable electronic load circuit.

Clause 18. The variable electronic load tester circuit of clause 17, wherein the variable electronic load circuit comprises a plurality of resistors of equal value connected in series to equally divide the voltage received from the power supply and connected in parallel with the plurality of transistors.

Clause 19. The variable electronic load tester circuit of clause 18, wherein the plurality of transistors is equal to the plurality of resistors.

Clause 20. The variable electronic load tester circuit of any of clauses 18-19, wherein a voltage across each of the plurality of resistors is applied to a gate of each of the plurality of the transistors; and wherein the voltage across each of the plurality of resistors controls a resistance of each of the plurality of transistors.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC § 112 (f). Absent a recital of "means for" in the claims, such claims should not be construed under 35 USC § 112. Limitations from the specification are not intended to be read into any claims, unless such limitations are expressly included in the claims.

Embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A variable electronic load tester circuit, comprising:
a control circuit; and
a variable electronic load circuit coupled to the control circuit to receive a voltage from a power supply and present a load to the power supply, wherein the variable electronic load circuit comprises:
a plurality of transistors connected in series and operable as variable resistors; and
wherein the control circuit is to control a resistance of the variable resistors to control the load presented to the power supply; and
wherein the control circuit comprises:
an error amplifier to compare a first voltage to a feedback signal and an output signal indicative of a difference between the first voltage and the feedback signal, wherein the output signal is to control the resistance of the variable electronic load circuit to vary the load presented to the power supply, wherein the feedback signal is proportional to a current flowing through the variable electronic load circuit.

2. The variable electronic load tester circuit of claim 1, wherein the variable electronic load circuit comprises a plurality of resistors of equal value connected in series to equally divide the voltage received from the power supply and connected in parallel with the plurality of transistors.

3. The variable electronic load tester circuit of claim 2, wherein the plurality of transistors is equal to the plurality of resistors.

4. The variable electronic load tester circuit of claim 2, comprising a transistor connected between the error amplifier and the plurality of resistors, wherein the output signal of the error amplifier is to control a conductance of the transistor to set a current through the plurality of resistors.

5. The variable electronic load tester circuit of claim 4, wherein the plurality of transistors are Field Effect Transistors (FETs); wherein a voltage across each of the plurality of resistors is applied to a gate of each of the plurality of the transistors; and wherein the voltage across each of the plurality of resistors controls a resistance of each of the plurality of transistors.

6. The variable electronic load tester circuit of claim 1, wherein the first voltage used to set the load current.

7. The variable electronic load tester circuit of claim 1, further comprising:
a relay coupled to a circuit power supply, wherein the relay is in an activated state when coupled to the circuit power supply, wherein the activated state is configured to power components of the variable electronic load tester circuit and couple the power supply to the variable electronic load circuit.

8. The variable electronic load tester circuit of claim 1, wherein the feedback signal is derived from a current sense resistor.

9. A method of operating a continuously variable electronic load tester circuit, the method comprising:
receiving, by a variable electronic load circuit, a voltage from a power supply;
presenting, by the variable electronic load circuit, a load to the power supply;
operating, by a control circuit, a plurality of transistors connected in series as variable resistors;
controlling, by the control circuit, a resistance of the variable resistors to control the load presented to the power supply;
comparing, by an error amplifier, a first voltage to a feedback signal; and
outputting, by the error amplifier, an output signal indicative of a difference between the first voltage and the feedback signal, wherein the output signal is to control the resistance of the variable electronic load circuit to vary the load presented to the power supply, wherein the feedback signal is proportional to a current flowing through the variable electronic load circuit.

10. The method of claim 9, dividing equally, by a plurality of resistors of equal value connected in series and connected in parallel with the plurality of transistors, the voltage received from the power supply.

11. The method of claim 10, wherein the plurality of transistors is equal to the plurality of resistors.

12. The method of claim 10, further comprising:
controlling, a conductance of a transistor based on the output signal, wherein the transistor is connected between the error amplifier and the plurality of resistors; and
setting a current through the plurality of transistors based on the conductance of the transistor.

13. The method of claim 10, further comprising:
applying a voltage across each of the plurality of resistors to a gate of each of the plurality of transistors; and
controlling a resistance of each of the plurality of transistors based on the voltage across each of the plurality of resistors.

14. The method of claim 9, further comprising setting the load current based on the first voltage.

15. The method of claim 9, further comprising:
activating a relay based on a circuit power supply being coupled to the relay,
powering, by the circuit power supply, components of the variable electronic load circuit; and
coupling, by the relay, the power supply to the variable electronic load circuit.

16. The method of claim 9, deriving the feedback signal from a current sense resistor.

17. A variable electronic load tester circuit, comprising:
a control circuit; and
a variable electronic load circuit coupled to the control circuit to receive a voltage from a power supply and present a load to the power supply, wherein the variable electronic load circuit comprises:
a plurality of transistors connected in series and operable as variable resistors; and
wherein the control circuit is to control a resistance of the variable resistors to control the load presented to the power supply; and
wherein the control circuit to compare a first voltage to a feedback signal and an output signal indicative of a difference between the first voltage and the feedback signal, wherein the output signal is to control the resistance of the variable electronic load circuit to vary the load presented to the power supply, wherein the feedback signal is proportional to a current flowing through the variable electronic load circuit.

18. The variable electronic load tester circuit of claim 17, wherein the variable electronic load circuit comprises a plurality of resistors of equal value connected in series to equally divide the voltage received from the power supply and connected in parallel with the plurality of transistors.

19. The variable electronic load tester circuit of claim 18, wherein the plurality of transistors is equal to the plurality of resistors.

20. The variable electronic load tester circuit of claim 18, wherein a voltage across each of the plurality of resistors is applied to a gate of each of the plurality of the transistors; and wherein the voltage across each of the plurality of resistors controls a resistance of each of the plurality of transistors.

\* \* \* \* \*